Patented June 1, 1948

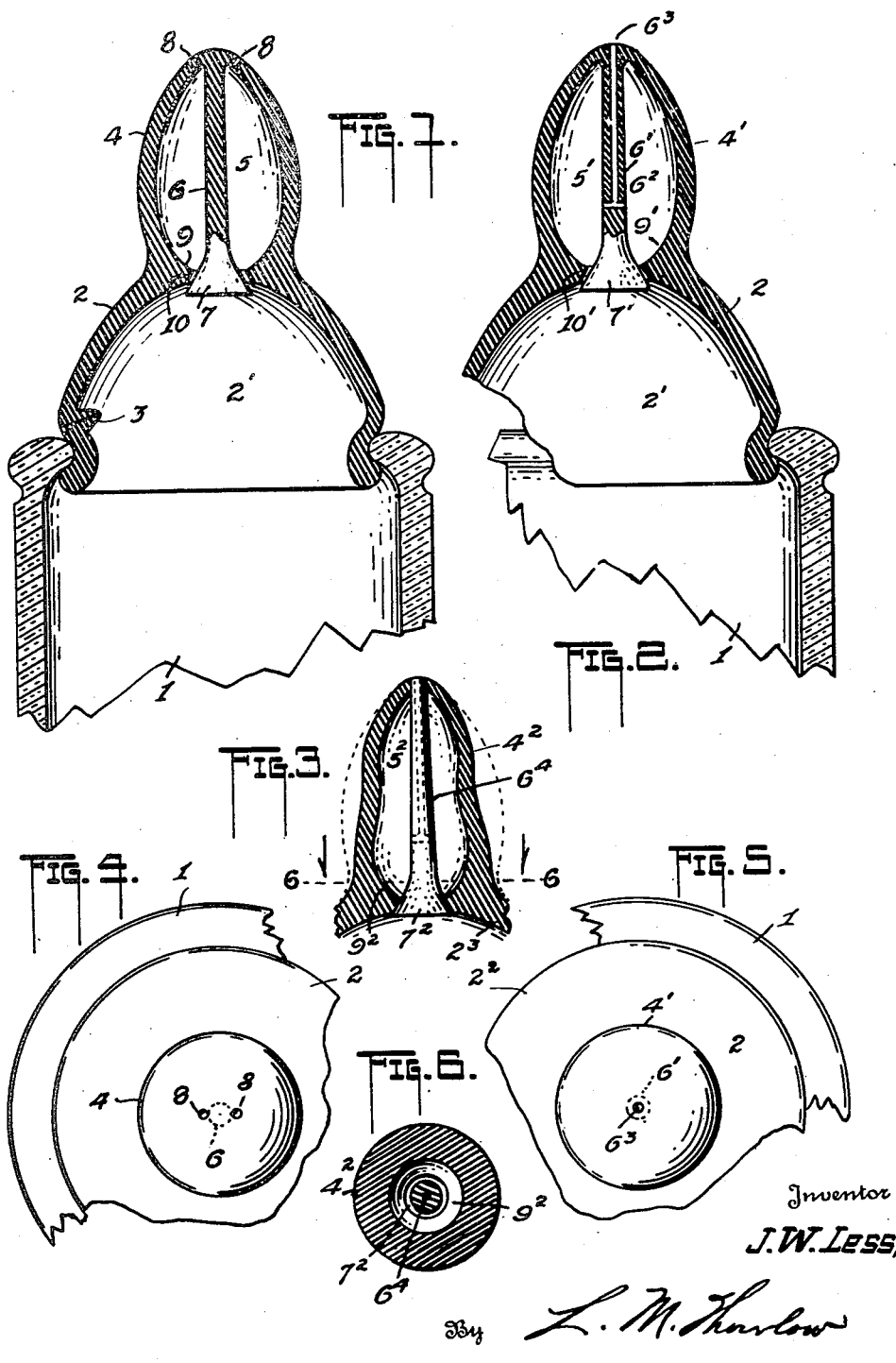

2,442,656

UNITED STATES PATENT OFFICE 2,442,656

NURSING NIPPLE FOR BOTTLES

Joseph W. Less, Clinton, Iowa

Application November 29, 1946, Serial No. 712,944

7 Claims. (Cl. 128—252)

This invention pertains to improvements on nursing nipples for bottles.

More particularly, the present invention has to do with a nursing nipple forming the subject of my patent applicaton Serial No. 696,669, filed in the U. S. Patent Office September 13, 1946.

An object of the present invention is to provide a valving means for control of the milk supply within a nipple wherein a wall of the latter and a valve member affixed to the said nipple serve jointly to interrupt flow of milk to the nipple from the source of supply during feeding and, contrarywise, to restore communication between said source and said nipple.

Another object is that of so organizing a valving structure that a valve member and a valve seat, as parts of a nipple, will be made to cooperate to both permit milk flow into said nipple or interrupt said flow by the action of the baby, during feeding, to the end that ntural feeding at a mother's breast will be simulated.

Still another object is to provide a valve member and valve seat, as component parts of a feeding nipple, so arranged and correlated that pressure applied by the feeding infant upon the walls of the nipple will result in elongating the latter to direct the valve seat thereof upon the valve member, which latter has a relatively fixed position, the said walls due to their resiliency, and in assuming their unflexed positions when pressure thereon is released, will remove said seat from the valve member.

That the invention may be fully understood, the appended drawing is provided forming part hereof, wherein Figures 1 and 2 are longitudinal sections of the nipple of my invention in two slightly different forms.

Figure 3 is a longitudinal section of another form of the nipple and wherein a valve seat and valve member are shown in abutting relation as distinguished from said Figures 1 and 2.

Figures 4 and 5 are plans, in part, of Figures 1 and 2 respectively, and

Figure 6 is a cross section of Figure 3 on line 6—6 of that figure.

For the purpose of best showing the invention the figures are shown much larger than the device as used in practice.

In Figures 1 and 2 of said drawing is shown any usual container 1, such as a glass member, with which is suitably connected in a detachable manner a socalled "breast member" 2 of rubber in the form of a dome having a cavity 2' which dome may have at 3, Figure 1, any usual inlet for air, and which may automatically open and close in the well known manner, and for an understood purpose. Surmounting this domed member 2, and preferably formed therewith, is a nipple 4, the construction of which, as with others shown herein, is the important part of the present invention.

Said nipple may be of rounded form in cross section, and has the usual cavity 5, the walls thereof having a thickness suitable for the purpose of said invention, and which in this instance are outwardly bulged, the whole having a somewhat ovoid form.

Depending from the upper small extremity of the nipple is a stem 6 which may be an integral part of the structure. Said stem is centrally located and terminates at its lower extremity in a valve head 7 of a coned form, in this instance, or having a downwardly and outwardly facing surface. In the said upper small extremity of the nipple one or more apertures 8 may be provided for feeding, these communicating with the cavity 5.

It is observed that the said walls of the nipple converge within the said cavity 5 and lie near the valve-head 7 but are normally spaced therefrom as at 9, said walls thereof being outwardly and downwardly inclined forming a coned seat 10 agreeing in angle with the coned face of the valve head 7, it also being observed that, normally, the so presented seat 10 lies above and slightly distant from said head 7. In this relation of the seat and head it will be seen that pressure on the walls 4 to move them toward each other will bring the seat and head into abutting relation from the fact that as said walls approach each other they are elongated, resulting in depressing the seat while also drawing the stem 6 toward said seat, the degree of this coaction depending upon the extent of flexibility of the rubber as well as the resistance thereof to the pressure exerted. For example, if the material in the neighborhood of the seat 10 at the position 2 tends to resist pressure the most movement would naturally be at the nipple extremity thus raising the valve head against the said seat. In any event a complete severing of communication of the cavities 2' and 5 results.

In Figure 2 substantially the same structure is shown as in Figure 1, characters $2^2$, 4', 5', 6' and 7' coresponding, respectively, with 2, 4, 5, 6 and 7 of the latter figure. In this instance, however, the stem 6' is provided with a transverse passage $6^2$ opening into the space 5', while a longitudinal passage $6^3$ communicates with said transverse passage and terminates upon the nipple point as the feeding aperture.

Figure 3 shows the same structure as that in the preceding figure the breast portion being identified by 2³, the nipple by 4² and the stem and its valve head by 6⁴ and 7² respectively. The stem in this form may be a separate member but let into the nipple wall and cemented or vulcanized in place. And said stem may have the passages 6², 6³ of Figure 2, or the nipple may have a feeding aperture corresponding to 8 of Figure 1, or combination of both may be used, as desired.

In this figure the side walls of the nipple are shown partially collapsed with the valve seat and valve head in abutment due to the named elongation of such walls.

It is to be seen that the valving arrangement employed herein is positive in operation since the opening of and cutting off of cavity communication directly follows the child's acts and whims with respect to pressure upon the nipple and relaxations of such pressures.

Conceivably, the abutting faces of the valve 7 and the seat 10 might be otherwise provided instead of being angularly arranged as herein, although, perhaps, the latter may be the preferred form.

The separation space between the seat 10 and the valve 7 may be but slight due to the extent of the circular exposure of that space so that free passage of liquid in volume is assured. This being true, the valve, since lying so close to the seat, in fact, becomes a guide in the closing movement of the seat portion, a tight seal always resulting. The seat portion may be made quite resistant to distortion by making the wall of sufficient thickness, so that such tight sealing of the opening is positive.

Having described the structure of the nipple, the following may be stated concerning the purpose and advantage of such structure in baby feeding:

A child's feeding acts are somewhat rhythmic and in cycles, i. e., alternate "sucking" on and release of the nipple. During these rhythmic cycles of alternate impulses and relaxations milk is accumulated in the mouth, mixing with the saliva. The child swallows when a sufficient amount of milk has accumulated. Swallowing, however, is not necessarily rhythmic but is subject to the child's natural acts, or intuition, perhaps. The frequency of swallowing also depends upon the rate of flow of the milk from the nipple.

This all has to do with the operation of the present structure. That is to say, half of the cycle is the so called sucking period at which time the valve 7 is closed by tongue pressure upon the sides of the nipple, which elongates the latter, whereupon the milk is forced out of the nipple cavity 5 into the mouth. During the other half of the cycle, or when the pressure is removed, the valve opens automaticaly and said cavity 5 is refilled by the suction set up in that cavity as the nipple regains its natural rounded form. At this time, of course, suction by the child has ceased since the mouth cavity is constricted in the process of flattening the nipple, and by the presence of the milk in said mouth cavity. Following this the cycle is repeated.

Having thus set forth the structure of the nipple and its operation in respect to the natural acts of the child the following may be considered.

It is believed conceded that in nursing at the mother's breast the "sucking" by the baby does not actually draw the milk but rather it is the pressure of the tongue, lips and gums upon the nipple that forces the milk out. Also the child's lips and gums act as a valve by shutting off the milk to prevent it from passing back into the breast, while during the relaxation period, when the child ceases to draw, the nipple again naturally fills. Thus the child may have a proper supply of nourishment during its feeding efforts.

This same result is achieved by the nipple structure herein described where a constant supply of milk is supplied from the bottle as contrasted to the customary results in bottle feeding.

In use the nipple is first upturned so that the pressure of milk in the cavity 5 is assured whereby it may be readily withdrawn from the cavity 2'. The sucking act starts the series of cycles of alternate pressure on the nipple and the release thereof.

During the sucking part of the cycle or immediately following it, the child's tongue, lips and gums apply pressure upon the nipple walls thus closing the valve 7 and at the same time the capacity of the cavity 5 by the collapsing thereof, forces the milk therefrom for feeding, no milk being permitted to return to said cavity 2' due to the closed valve. In the removal of pressure on the walls 4 the valve 7 opens and the partial vacuum in said cavity 5 causes the same to be filled from the cavity 2' for the next feeding supply. Alternate pressures and relaxations by the infant thus maintains steady milk flow. Swallowing, meanwhile, interrupts the progression of these cycles, as the child's natural act, or intuition.

It is believed clear that such a structure will be seen as serving the purpose based upon nature's method of feeding first described, the bottle method herein being of advantage over known methods since having many advantages in respect to the child's well being.

In present day bottle feeding the infant derives the milk by suction alone causing over exertion, while at the same time upsetting its temperament, and forcing rest periods, whereas in the present structure the usual suction efforts are turned to one of pressure acts as in nature feeding. In the latter manner of feeding the infant does not stop and need not stop for rest periods, and this being true of the method herein the bottle is emptied with ease and tranquility. It has been determined that at least one third less effort is required than in employing ordinary methods of bottle feeding.

I claim:

1. A feeding device for bottle-fed infants including a cavitied nipple for receiving a supply of the liquid food, and having a feeding opening, the side walls of the nipple being bulged outwardly, the lower wall of the nipple having an opening and also having a valve seat at said opening, and a valve carried by and depending from the upper wall of the nipple and terminating at said opening, the valve and said seat adapted to abut for closing said opening when pressure is placed upon said walls to elongate them.

2. A feeding device for bottle fed infants including a cavitied nipple having a feeding opening, the former for receiving a supply of the liquid food, the side walls of the nipple being bulged outwardly, a valve-seat at the lower wall of said nipple having an opening therethrough, and a valve carried by and depending from another wall of the nipple the same extending into said opening in the valve seat, the latter adapted to be brought into abutment with the valve to close said opening when pressure is applied to the said side walls, elongating the same.

3. In a feeding nipple for bottle feeding of infants, the combination with a bottle, and a cavitied breast portion for attachment to the latter, and a cavitied nipple substantially ovoid in form surmounting said breast portion and having a feeding aperture, the cavities of the two normally communicating, of a stem within the cavity of said nipple depending from the point-extremity of said nipple, said stem having a portion constituting an abutment, said abutment lying substantially central of the cavity of said nipple and lying below and outside of the same, a lower wall portion of the nipple being constricted and encircling the stem near said abutment, said abutment and the constricted portion of said nipple adapted to abut to interrupt communication of the two named cavities when the nipple walls are elongated by pressure upon said walls.

4. In a feeding nipple for bottle feeding of infants, the combination with a bottle and a cavitied breast portion for attachment to the bottle, of a cavitied nipple substantially ovoid in form surmounting the said breast portion and provided with a feeding aperture, the cavities of the two named portions normally communicating, a stem within the cavity depending from the point-extremity of the nipple substantially central of said cavity thereof, said stem having a portion constituting an abutment lying below and outside said cavity and facing the cavity of the said breast portion, a lower wall of the nipple having a constricted opening through which the stem extends, said wall at said opening encircling the stem above the named abutment, the latter and said nipple wall at said opening adapted to abut to interrupt communication between the two named cavities when the side walls of the nipple are elongated by pressure on said side walls by a feeding infant.

5. In a feeding nipple for bottle feeding of infants, the combination with a bottle and a cavitied breast portion for attachment to the bottle, of a cavitied nipple substantially ovoid in form surrounding the said breast portion and provided with a feeding aperture, the cavities of the two named portions normally communicating, a stem within the cavity depending from the point-extremity of the nipple substantially central of said cavity thereof, and integral with said nipple, said stem having a portion constituting an abutment lying below and outside said cavity and facing the cavity of the said breast portion, a lower wall of the nipple having a constricted opening through which the stem extends, said wall at said opening encircling the stem above the named abutment, the latter and said nipple wall at said opening adapted to abut to interrupt communication between the two named cavities when the side walls of the nipple are elongated by pressure on said side walls by a feeding infant.

6. In a feeding nipple for bottle feeding of infants, the combination with a bottle and a cavitied breast portion for attachment to the bottle, of a cavitied nipple substantially ovoid in form surmounting the said breast portion and provided with a feeding aperture, the cavities of the two named portions normally communicating, a stem within the cavity depending from the point-extremity of the nipple substantially central of said cavity thereof, said stem having a portion constituting an abutment lying below and outside said cavity and facing the cavity of the said breast portion, a lower wall of the nipple having a constricted opening through which the stem extends, said wall at said opening encircling the stem above the named abutment, the latter and said nipple wall at said opening adapted to abut to interrupt communication between the two named cavities, when the side walls of the nipple are elongated by pressure on said side walls by a feeding infant, said stem having a passage extending longitudinally thereof communicating with the cavity of said nipple and terminating at and communicating with said feeding aperture of the latter.

7. In a feeding nipple for bottle feeding of infants, the combination with a bottle and a cavitied breast portion for attachment to the bottle, of a cavitied nipple substantially ovoid in form surrounding the said breast portion and provided with a feeding aperture, the cavities of the two named portions normally communicating, a stem within the cavity depending from the point-extremity of the nipple substantially central of said cavity thereof, said stem having a portion constituting an abutment lying below and outside said cavity and facing the cavity of the said breast portion, a lower wall of the nipple having a constricted opening through which the stem extends, said wall at said opening encircling the stem above the named abutment, the latter and said nipple wall at said opening adapted to abut to interrupt communication between the two named cavities, when the side walls of the nipple are elongated by pressure on said side walls by a feeding infant, said stem being separate from the nipple structure and insertable into its wall and secured leaktight therein.

JOSEPH W. LESS.

REFERENCES CITED

The following references are of record in the file of this patent:

UNITED STATES PATENTS

| Number | Name | Date |
| --- | --- | --- |
| 2,219,604 | Trotter | Oct. 29, 1940 |